United States Patent [19]

Mason

[11] 4,090,235

[45] May 16, 1978

[54] POWER FREQUENCY CONVERTER

[75] Inventor: William B. Mason, Arlington, Tex.

[73] Assignee: Teccor Electronics, Inc., Euless, Tex.

[21] Appl. No.: 713,403

[22] Filed: Aug. 11, 1976

[51] Int. Cl.[2] .............................................. H02M 5/257

[52] U.S. Cl. ...................................................... 363/160

[58] Field of Search ....................... 307/220 R; 321/61; 363/160

[56] References Cited

U.S. PATENT DOCUMENTS

| | | | |
|---|---|---|---|
| 3,246,231 | 4/1966 | Clarke | 321/61 X |
| 3,354,377 | 11/1967 | Leeds, Jr. | 323/22 |
| 3,355,647 | 11/1967 | Braus | 321/61 X |
| 3,452,214 | 6/1969 | Martin | 323/22 |
| 3,663,945 | 5/1972 | Hughes et al. | 321/61 |
| 3,718,854 | 2/1973 | Spyrov et al. | 307/220 X |
| 3,967,185 | 6/1976 | Brooks | 321/61 |

*Primary Examiner*—William M. Shoop
*Attorney, Agent, or Firm*—Hubbard, Thurman, Turner, Tucker & Glaser

[57] ABSTRACT

Circuitry for converting the nominally 600 hertz output of a gasoline engine driven magneto to 60 hertz. A pair of oppositely poled controllably enabled full wave rectifiers is connected to the magneto and the load. A zero crossing detector is coupled between the magneto and a counter. A rectifier control circuit is responsive to the counter output for controlling which of the full wave rectifiers is enabled.

8 Claims, 8 Drawing Figures

POWER FREQUENCY CONVERTER

BACKGROUND OF THE INVENTION

This invention relates to power frequency converters and, more particularly, to circuitry for providing AC power at a frequency which is a fraction of the input power frequency.

When generating electricity utilizing a magneto driven by a gasoline engine, the output frequency of the magneto is a function of the speed of the gasoline engine. Typically, gasoline engine driven portable electric generators are designed to provide a 600 hertz magneto output. To make the output of the generator compatible with standard electric appliances, the frequency of the generator must be reduced by a factor of 10 down to 60 hertz. It has been found that the actual wave shape of the resultant output power is not important so long as the wave shape is symmetrical and has no DC component.

Prior art attempts to change the frequency have not proved entirely satisfactory. Many of these circuits utilize a separate magneto winding to power the conversion circuitry. In addition, many of these circuits consume an appreciable amount of power, limiting the power available to the load. Furthermore, sensitivity to load power factor and load generated noise has proven to be a problem.

It is therefore an object of this invention to provide new and improved circuitry for power frequency conversion.

Another object is to provide power conversion circuitry for converting the 600 hertz output of a gasoline engine driven magneto to 60 hertz.

A further object is to provide power frequency conversion circuitry having reduced power requirements.

Still another object is to provide power frequency conversion circuitry which is insensitive to load power factor or load generated noise.

SUMMARY OF THE INVENTION

In accordance with principles illustrative of this invention, circuitry is advantageously provided to convert the 600 hertz output of a gasoline engine driven magneto to 60 hertz. This circuitry utilizes two pairs of silicon controlled recitifiers, each pair arranged as a controllably enabled full wave rectifier of opposite polarity to the other pair. At any given time, only one pair of SCR's is conductive. The conductivity of the SCR's is controlled by circuitry utilizing a counter. The zero crossings of the magneto output are sensed and signals generated therefrom to increment a counter. The counter controls which of a pair of pulse transformers is enabled to receive pulses from a pulse generator. The secondary windings of the pulse transformers are connected to respective SCR pairs to control their conductivity. At every tenth zero crossing, the conductivity of the SCR's is changed.

DESCRIPTION OF THE DRAWING

The foregoing will be more readily apparent upon reading the following description in conjunction with the drawings in which.

DESCRIPTION OF THE PREFERRED EMBODIMENT

Figure 1:
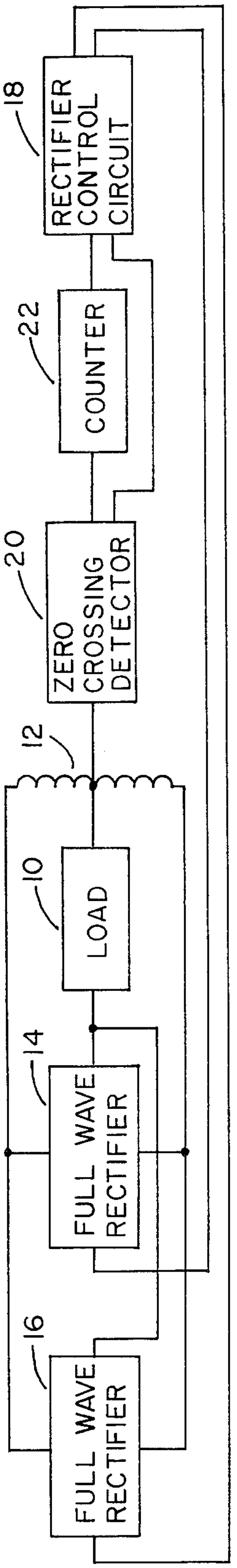
FIG. 1 depicts a block schematic diagram of illustrative circuitry operating in accordance with the principles of this invention.

Referring now to FIG. 1, depicted therein is a block diagram of illustrative circuitry embodying the principles of this invention and adapted to provide AC power across a load 10 at a frequency which is a fraction of the frequency of the power fenerated across the winding 12 of a magneto driven by a gasoline engine (not shown). A pair of full wave rectifiers 14 and 16 are connected across winding 12 and load 10 with opposite polarities of rectification. Rectifiers 14 and 16 are enabled alternately by rectifier control circuit 18 in accordance with signals generated by zero crossing detector 20 and counter 22. Zero crossing detector 20 is connected to the center tap of winding 12 and generates a signal to cause the incrementing of counter 22. Counter 22 is illustratively a decade counter which changes state at every tenth zero crossing. (It is understood that any suitable counter may be utilized in place of decade counter 22, depending upon the required frequency division factor.) Rectifier control circuit 18 is responsive to the state of counter 22 and controls which of full wave rectifiers 14 and 16 is enabled. The power supplied to load 10 is therefore at 1/10 the frequency of the power generated across winding 12.

Figure 2:
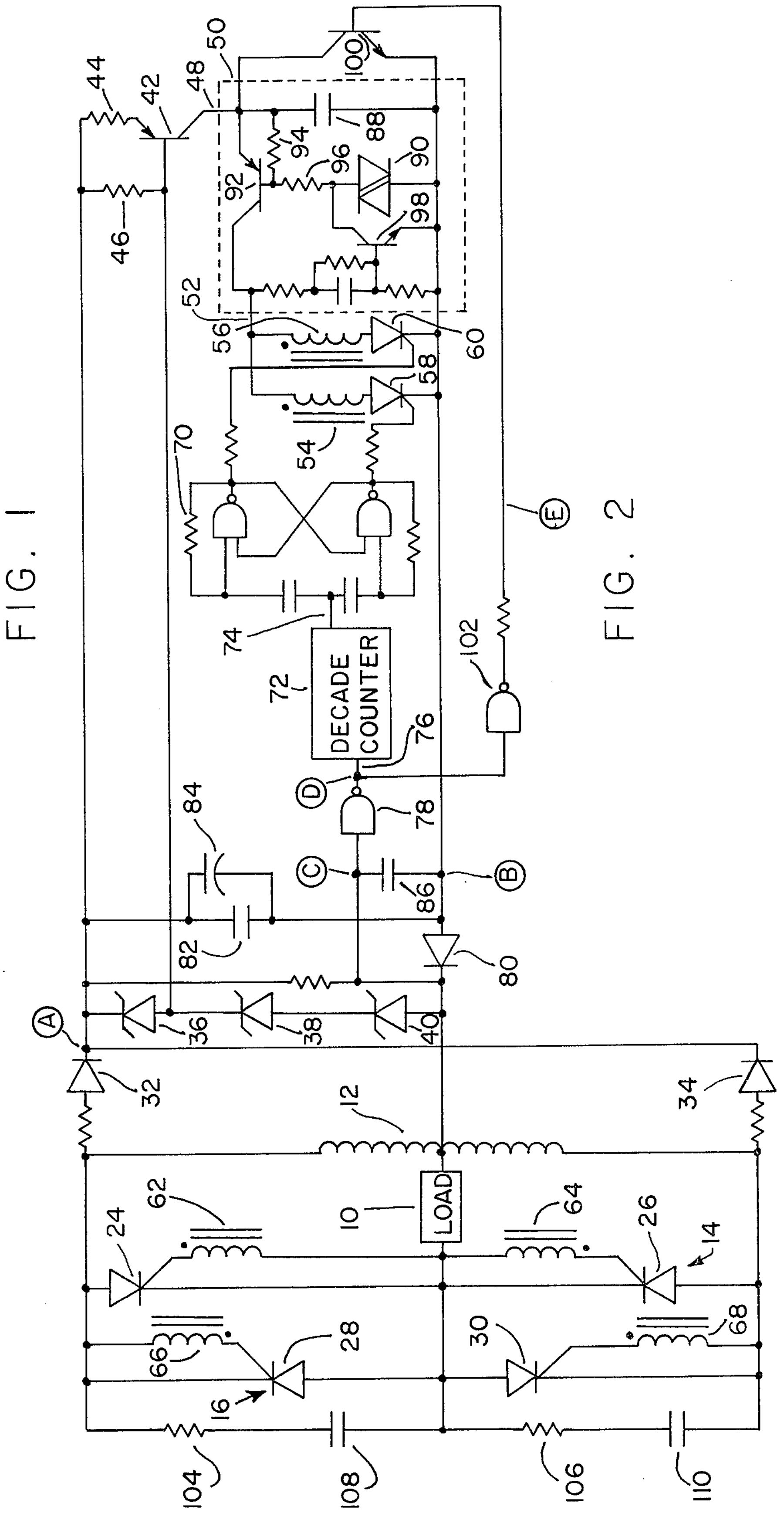
FIG. 2 depicts a detailed schematic diagram of circuitry implementing the block diagram of FIG. 1.

FIG. 2 depicts illustrative circuitry implementing the block schematic diagram of FIG. 1. As shown in FIG. 2, load 10 is connected at one end to the center tap of magneto winding 12. Full wave rectifier 14 comprises silicon controlled rectifier (SCR) 24 and SCR 26, the cathodes of which are connected together and to the other end of load 10. The anodes of SCR's 24 and 26 are connected to opposite ends of winding 12. Similarly, full wave rectifier 16 comprises SCR 28 and SCR 30. The polarity of full wave rectifier 16 is opposite from that of full wave rectifier 14, with the anodes of SCR's 28 and 30 being connected together and to the other end of load 10. The cathodes of SCR's 28 and 30 are connected to opposite ends of winding 12. Thus, when SCR's 24 and 26 are enabled to conduct, a full wave rectification of the output of winding 12 will have a first polarity through load 10 and when SCR's 28 and 30 of full wave rectifier 16 are enabled to conduct, there will be a full wave rectification of the output of winding 12 having a second polarity through load 10.

Figure 3A:
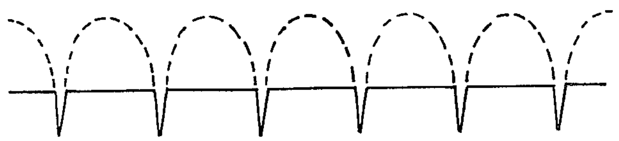
FIGS. 3A through 3E depic illustrative waveforms at various points in the circuit of FIG. 2.

To power the frequency conversion circuitry, connected across winding 12 are a pair of diodes 32 and 34 having their cathodes connected together to form a full wave rectifier with respect to the center tap of winding 12. Serially connected between the center tap of winding 12 and the cathodes of diodes 32 and 33 are zener diodes 36,38 and 40. These zener diodes are illustratively 5.1 volt zener diodes. The voltage waveform at point A is depicted in FIG. 3A, where the broken line shows what the full wave rectification would look like without the zener diode string.

The full wave rectified voltage at point A is applied to a constant current generator comprising transistor 42 and resistors 44 and 46. The base of transistor 42 is connected to one end of resistor 46 and the junction between the anode of zener diode 36 and the cathode of zener diode 38. Transistor 42 is therefore biased to conduct and supply a constant current over line 48 to pulse generator 50. Pulse generator 50 is arranged, in a manner to be described in detail hereinafter, to apply a train of pulses to lead 52. The pulses on lead 52 are steered to pulse transformer primary windings 54 or 56 depending upon which of respective SCR's 58 and 60 is enabled to conduct. Primary winding 54 is associated with secondary windings 62 and 64 and primary winding 56 is associated with secondary windings 66 and 68. Therefore, when SCR 58 is enabled to conduct, the pulse train on line 52 is steered through primary winding 54, thereby inducing pulses in secondary windings 62 and 64 which are connected to the gate electrodes of SCR's 24 and 26, respectively. These induced pulses enable full wave rectifier 14 by enabling SCR's 24 and 26 to conduct, applying a full wave rectified output from magneto winding 12 through load 10 with a first polarity. When SCR 60 is enabled to conduct, the pulse train on line 52 is steered through primary winding 56, inducing pulses in secondary windings 66 and 68 to enable full wave rectifier 16 to supply the full wave rectified output of magneto winding 12 in the opposite polarity through load 10.

SCR's 58 and 60 are alternately enabled through the action of toggle flip-flop 70, connected to the output of decade counter 72 over lead 74. The input to decade counter 72 is over lead 76. Lead 76 is connected to the output of inverter 78 whose input is connected to circuitry functioning as a zero crossing detector with respect to the output from magneto winding 12.

Figure 3B:
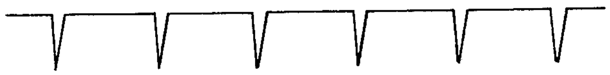
Figure 3C:
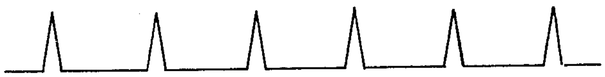
Figure 3D:
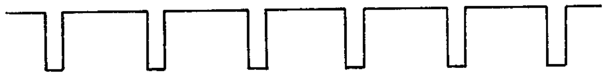
Figure 4:
FIG. 4 depicts an output waveform into a resistive load generated by the circuitry of FIG. 2.

Due to the action of diode 80 and capacitors 82 and 84, the voltage at point B with respect to the center tap of magneto winding 12 tracks the voltage at point A, as shown in FIG. 3B. With respect to the voltage at point B, the voltage at point C is as shown in FIG. 3C. This is due to the action of capacitor 86 and the principle that the voltage across a capacitor cannot change instantaneously. Therefore, inverter 78 produces a voltage at its output on lead 76 at point D as shown in FIG. 3D. This negative pulse applied to decade counter 72 acts to increment the counter. Whenever decade counter 72 reaches the count of 10, the output level on lead 74 changes, toggling flip-flop 70 and enabling the one of SCR's 58 and 60 that was not previously enabled while disabling the one that was enabled. Thus, every 10 zero crossings of the output waveform of magneto winding 12, a different one of SCR's 58 and 60 is enabled, thereby steering the pulse train on lead 52 into a different pulse transformer primary winding 54 or 56. This provides the voltage waveform shown in FIG. 4 across load 10.

Figure 3E:

Pulse generator 50 generates the pulse train on lead 52 to primary windings 54 and 56 in the following manner. Collector current from transistor 42 in the constant current generator flows through lead 48 to initiate charging of capacitor 88. Silicon bidirectional switch (SBS) 90 is initially non-conducting so that PNP transistor 92 remains in the non-conductive state. When capacitor 88 charges to a pedetermined breakdown voltage, SBS 90 breaks down and becomes conductive, providing a first discharge path for capacitor 88 through resistors 94 and 96. The conduction of SBS 90 causes transistor 92 to turn on, creating a lower impedance path for the discharge current of capacitor 88, this discharge current then being applied to line 52. Some of the discharge current flows into the base of transistor 98, causing it to conduct and short circuit SBS 90, thereby removing the holding current and returning SBS 90 to its high impedance state while still keeping transistor 92 conductive. Adding to the discharge current of capacitor 88 is the constant current over line 48 through transistor 92 into the one of the primary windings 54 and 56 which is enabled by its respective SCR being conductive. When capacitor 88 discharges to a certain level, the portion of the discharge current of the capacitor summed with the collector current of transistor 42 flowing into the base of transistor 98 is insufficient to maintain transistor 98 conductive. When transistor 98 turns off, this causes transistor 92 to be turned off, thereby repeating the cycle of charging and discharging capacitor 88, causing a pulse train on lead 52. The capacitive and resistive values of the circuitry are chosen and the charging current selected to generate enough pulses per unit time to insure that the SCR pairs in rectifiers 14 and 16 will be continually gated on early in each half cycle of the 600 hertz output of the magneto. Synchronization is achieved through the use of transistor 100. It will be recalled that at each zero crossing of the magneto output, a negative pulse was generated on line 76 to increment decade counter 72. The waveform at point D (on line 76) is illustrated in FIG. 3D. This negative pulse is inverted by inverter 102, the output of which is coupled to the base of transistor 100. The waveform of the voltage at point E (at the base of transistor 100) is illustrated in FIG. 3E. This positive pulse causes transistor 100 to conduct and short circuit capacitor 88, totally discharging that capacitor. This action insures that the pulse train on line 52 is synchronized every half cycle of the magneto output.

Resistors 104 and 106 and capacitors 108 and 110 provide transient voltage protection when the load has inductive characteristics. The capacitors prevent an abrupt change in voltage which could cause a conducting SCR to become non-conductive.

The logic elements of the circuitry of FIG. 2, such as counter 72, inverters 78 and 102, and the gates in toggle flip-flop 70, are all powered by connecting their internal power leads to point A and their internal grounds to point B. Thus, only the single magneto winding 12 is necessary.

Accordingly, there has been described improved power frequency conversion circuitry. While the invention has been described with reference to its preferred embodiment, it will be understood by those skilled in the art that various changes may be made and equivalents substituted for elements thereof without departing from the true spirit and scope of the invention, as defined by the appended claims. In addition, many modifications may be made to adapt a particular situation to the teachings of the invention without departing from its essential teaching.

What is claimed is:

1. Circuitry for converting power generated across a magneto winding at a first frequency to power at a second frequency, said magneto winding having a first terminal at one end thereof, a second terminal at the other end thereof and a center tap terminal, said first frequency being an integral multiple of said second frequency, said circuitry comprising:

first full wave rectifier means connected across said first and second terminals in a first polarity direction and operative responsive to an enabling signal applied thereto;

second full wave rectifier means connected across said first and second terminals in a second polarity direction opposite from said first polarity direction and operative responsive to said enabling signal applied thereto;

means for connecting a load at one end to said center tap winding and at the other end to said first and second full wave rectifier means;

means responsive to the waveform generated across said winding to derive a rectified and regulated voltage therefrom;

means responsive to said rectified and regulated voltage for detecting zero crossings of the waveform generated across said magneto winding and providing a zero crossing signal indicative thereof;

counting means responsive to said zero crossing signal for counting said zero crossings and providing an output signal whenever the count reaches said integral multiple;

means generating said enabling signal;

means for synchronizing said enabling signal with the waveform generated across said magneto winding at said first frequency; and steering means responsive to said output signal for steering said enabling signal alternately to said first and second full wave rectifier means.

2. The circuitry according to claim 1 wherein said first full wave rectifier means includes a first pair of silicon controlled rectifiers having their anodes respectively connected to said first and second magneto winding terminals and their cathodes connected together and to said other end of said load, said second full wave rectifier means includes a second pair of silicon controlled rectifiers having their cathodes respectively connected to said first and second magneto winding terminals and their anodes connected together and to said other end of said load, said enabling signal generating means includes pulse generating means, and said steering means includes a first pulse transformer having a primary winding connected to said pulse generating means and a pair of secondary windings each of which is connected between the gate and cathode of a respective silicon controlled rectifier in said first full wave rectifier means and said steering means further includes a second pulse transformer having a primary winding connected to said pulse generating means and a pair of secondary windings each of which is connected between the gate and cathode of a respective silicon controlled rectifier in said second full wave rectifier means.

3. The circuitry according to claim 2 wherein said steering means further includes bistable means responsive to said counting means output signal for changing state, first switch means serially connected to the primary winding of said first pulse transformer and responsive to said bistable means being in a first state for closing a path from said pulse generating means to said first pulse transformer primary winding, and second switch means serially connected to the primary winding of said second pulse transformer and responsive to said bistable means being in a second state for closing a path from said pusle generating means to said second pulse transformer primary winding.

4. The circuitry according to claim 3 further including constant current generating means and wherein said pulse generating means includes a capacitor, means coupling said capacitor to said constant current generating means for charging said capacitor, a PNP transistor having its emitter coupled to said capacitor and its collector coupled to said first and second pulse transformer primary windings, breakdown switching means coupled across said capacitor and to the base of said transistor and responsive to the voltage across said capacitor exceeding the breakdown voltage level of said breakdown switching means for causing said transistor to conduct, and timing means responsive to the conduction of said transistor for shortcircuiting said breakdown switching means and maintaining said transistor in conduction for a predetermined time period.

5. The circuitry according to claim 4, wherein said means for synchronizing includes means responsive to said zero crossing signal for completely discharging said capacitor.

6. The circuitry according to claim 3 wherein said bistable means comprises a toggle flip-flop having an input coupled to said counting means, a first output terminal poviding a signal at a pedetermined level when said flip-flop is in said first state, and a second output terminal providing a signal at said predetermined level when said flip-flop is in said second state, said first switch means comprises a silicon controlled rectifier having its gate electrode coupled to said flip-flop first output terminal, and said second switch means comprises a silicon controlled rectifier having its gate electrode coupled to said flip-flop second output terminal.

7. Circuitry for converting power generated across a magneto winding at a first frequency to power at a second frequency, said magneto winding having a first terminal at one end thereof, a second terminal at the other end thereof and a center tap terminal, said first frequency being an integral multiple of said second frequency, said circuitry comprising:

first full wave rectifier means connected across said first and second terminals in a first polarity direction and operative responsive to an enabling signal applied thereto;

second full wave rectifier means connected across said first and second terminals in a second polarity direction opposite from said first polarity direction and operative responsive to said enabling signal applied thereto;

means for connecting a load at one end to said center tap winding and at the other end to said first and second full wave rectifier means;

means for detecting zero crossings of the waveform generated across said magneto winding and providing a zero crossing signal indicative thereof;

counting means responsive to said zero crossing signal for counting said zero crossings and providing an output signal whenever the count reaches said integral multiple;

a current source;

means for generating said enabling signal, including;

a capacitor, means coupling said capacitor to said current source for charging said capacitor, a transistor coupling said current source to an enabling signal output terminal, break-down switching means, coupled to the base of said transistor and responsive to the voltage across said capacitor exceeding a break-down voltage level of said break-down switching means, for causing the transistor to conduct from the current source to said output terminal; and steering means, connected to the enabling signal output terminal, and responsive to said counting means output signal for steering said enabling signal alternately to said first and second full wave rectifier means.

8. Circuitry for converting power generated across a magneto winding at a first frequency to power at a second frequency, said magneto winding having a first terminal at one end thereof, a second terminal at the other end thereof and a center tap terminal, said first frequency being an integral multiple of said second frequency, said circuitry comprising:

first full wave rectifier means connected across said first and second terminals in a first polarity direction and operative responsive to an enabling signal applied thereto;

second full wave rectifier means connected across said first and second terminals in a second polarity direction opposite from said first polarity direction and operative responsive to said enabling signal applied thereto;

means for connecting a load at one end to said center tap winding and at the other end to said first and second full wave rectifier means;

means for detecting zero crossings of the waveform generated across said magneto winding and providing a zero crossing signal indicative thereof, at the magneto center tap terminal, including:

first and second diodes with a first one of the terminals of each diode connected to the like terminal of the other diode, and with the other terminal of each diode connected to a different one of said first and second magneto winding terminals, means for limiting, to a predetermined value, the voltage between said first terminals of said diodes and said magneto winding center tap terminal, a resistor connected from said first terminals of said diodes to said center tap terminal, and the series combination of a capacitor and a third diode, connected in parallel with said resistor, with the diode connected to said magneto center tap terminal;

counting means responsive to said zero crossing signal for counting said zero crossings and providing an output signal whenever the count reaches said integral multiple;

means generating said enabling signal; and steering means responsive to said output signal for steering said enabling signal alternately to said first and second full wave rectifier means.

* * * * *